United States Patent
Pich et al.

(10) Patent No.: US 7,814,977 B2
(45) Date of Patent: Oct. 19, 2010

(54) INSTALLATION FOR ENHANCED OIL RECOVERY USING WATER-SOLUBLE POLYMERS AND METHOD OF IMPLEMENTING

(75) Inventors: René Pich, Saint Etienne (FR); Philippe Jeronimo, Montrond Les Bains (FR)

(73) Assignee: S.P.C.M. SA, Saint Etienne (FR)

( * ) Notice: Subject to any disclaimer, the term of this patent is extended or adjusted under 35 U.S.C. 154(b) by 117 days.

(21) Appl. No.: 12/249,390

(22) Filed: Oct. 10, 2008

(65) Prior Publication Data

US 2009/0095483 A1    Apr. 16, 2009

Related U.S. Application Data

(60) Provisional application No. 60/982,244, filed on Oct. 24, 2007.

(30) Foreign Application Priority Data

Oct. 12, 2007   (FR)   ................................ 07 58251

(51) Int. Cl.
E21B 43/20   (2006.01)
E21B 43/22   (2006.01)
E21B 43/40   (2006.01)

(52) U.S. Cl. .................. 166/275; 166/75.11; 166/90.1; 166/266; 166/305.1; 241/16; 241/21; 241/38; 241/41; 507/904

(58) Field of Classification Search .............. 166/75.11, 166/90.1, 91.1
See application file for complete search history.

(56) References Cited

U.S. PATENT DOCUMENTS

| | | | | |
|---|---|---|---|---|
| 3,902,558 A | * | 9/1975 | Watson, Jr. | 166/305.1 |
| 4,034,809 A | * | 7/1977 | Phillips et al. | 166/270.1 |
| 4,544,032 A | * | 10/1985 | Echols | 166/267 |
| 4,640,622 A | * | 2/1987 | Sortwell | 366/76.3 |
| 4,874,588 A | * | 10/1989 | Sortwell et al. | 422/269 |
| 6,045,070 A | * | 4/2000 | Davenport | 241/60 |
| 6,337,308 B1 | * | 1/2002 | Adams et al. | 507/117 |
| 7,104,328 B2 | * | 9/2006 | Phillippi et al. | 166/308.5 |
| 7,441,717 B1 | * | 10/2008 | Majka et al. | 241/21 |
| 2009/0095481 A1 | * | 4/2009 | Pich et al. | 166/304 |
| 2009/0099306 A1 | * | 4/2009 | Pich et al. | 524/827 |
| 2009/0242201 A1 | * | 10/2009 | Van Beurden et al. | 166/275 |

FOREIGN PATENT DOCUMENTS

| FR | 1295921 A | 6/1962 |
|---|---|---|
| FR | 1422802 A | 1/1966 |
| FR | 2596407 A | 10/1987 |

OTHER PUBLICATIONS

French Search Report for FR 0758251, dated May 27, 2008.

* cited by examiner

*Primary Examiner*—George Suchfield
(74) *Attorney, Agent, or Firm*—Heslin Rothenberg Farley & Mesiti P.C.

(57) ABSTRACT

Installation for enhanced oil recovery comprising in succession: a polymer storage hopper, a grinding device and a pressurized injection pump. The grinding device has a chamber for grinding and draining the dispersed polymer comprising a rotor and a stator, and on all or part of the periphery of the chamber, a ring fed by a secondary water circuit. The ring communicates with the chamber for spraying of pressurised water on the blades of the stator. A method implementing the installation is also provided.

14 Claims, 2 Drawing Sheets

INSTALLATION FOR ENHANCED OIL RECOVERY USING WATER-SOLUBLE POLYMERS AND METHOD OF IMPLEMENTING

CROSS REFERENCE TO RELATED APPLICATIONS

This application claims priority of French application number 0758251 filed on Oct. 12, 2007 and U.S. provisional application No. 60/982,244 filed on Oct. 24, 2008, the full disclosures of which are hereby incorporated by reference herein.

BACKGROUND ART

The invention relates to an installation for enhanced oil recovery using water-soluble polymers. It also relates to a method of enhanced oil recovery implementing the said installation.

(Co)polymers of acrylamide and/or methacrylamide account for a large share of the water-soluble polymers used in the oil industry for numerous applications. Such polymers are highly advantageous in particular for improving enhanced oil recovery by injection in solution. This method consists in flooding/sweeping the oil field using a water injection more or less saline also called "brine" in which the polymer is dissolved to viscosity it, thereby forcing the oil to leave the pores of the rock. In this application, the quantities of polymers used may be very large, more than 50 000 tonnes/year, which is most unusual.

More precisely, the effectiveness of this technique is heavily dependent on the difference in viscosity existing between the oil and the brine. To reduce it, it is necessary to thicken the injection water using an addition of water-soluble polymers, very often a very high molecular weight polymer or copolymer of acrylamide and/or methacrylamide. This is one of the methods of Enhanced Oil Recovery (EOR).

However, these polymers are relatively sensitive to degradation. Among these forms of degradation, three types are distinguished: hydrolysis reactions, mechanical degradation and free radical degradation reactions. The first causes changes in the chemical composition of the polymer, while the other two cause a decrease in the chain length.

It is therefore very important to prevent the polymer chain from being degraded in order to preserve all the viscosifying properties of the polymer during its use.

In the present invention, "degradation" means any process causing a break in the chains of the macromolecule. This type of degradation implies the formation of free radicals which attack the macromolecular chains followed by propagation reactions. These free radicals, which are degradation initiators, may be formed in particular by redox reactions between the oxidizing parts (particularly oxygen) and the reducing parts (oxygen inhibitor, hydrogen sulphide, $Fe^{2+}$).

In practice, acrylamide (co)polymers are usually commercially available in the form of powders or emulsions. They are generally used in dilute aqueous solution for industrial applications. Due to their high molecular weight, the viscosity of the resulting solution is high. This has the consequence of limiting the concentration of the polymer in the solution if it is desired to partly eliminate the formation of aggregates in the dispersing device. This concentration commonly does not exceed 5 g/l for polymers having molecular weights of about 15 million. Above this, the formation of "fisheyes" is observed, corresponding to the actual aggregation of polymer powder. It is then necessary to apply coarse filtration (100-200 microns), and finer filtration (10-20 microns) to remove the "fisheyes" in two successive steps. Furthermore, the residence time in the dispersion device being relatively short, the polymer does not have the time to dissolve and is therefore not pumpable and usable as such, necessitating a subsequent maturation or dissolution step.

After dissolution, the polymer is diluted by the brine used on the field in order to obtain the required concentration (typically 500 to 3000 ppm) and viscosity (typically 5 to 50 centipoises).

In practice, the dispersion is carried out using one of the following means:
- a water eductor fed by a cone, itself wetted to prevent sticking,
- an air transport of the powder followed by wetting by water nozzles above the dissolution tank,
- any other method in which the powder is contacted with water under agitation.

With regard to the dissolution, this takes place in the open air in dissolution tanks with an oxygen saturation of 4 to 7 ppm which chemically degrades the injection polymer even in the presence of an oxygen reducer (ammonium bisulphite) by the formation of free radicals. Obviously, the aim is to be able to inject a solution having the precise concentration leading to the required viscosity. For example, at injection concentrations of 1000 to 2000 ppm and hourly flow rates of 500 $m^3$ to 2000 $m^3$, it is necessary to dissolve 500 to 4000 kg/hour of polymer, which is much larger than the quantities conventionally used, for example in flocculation, during sludge treatment operations.

The problem that the invention proposes to solve is to develop an installation for directly injecting the injection water/polymer mixture into the well, without passing through a prior dissolution step in tanks, and without requiring subsequent filtration.

BRIEF SUMMARY OF THE INVENTION

For this purpose, the Applicant has developed a wet grinding device for placing the high molecular weight polymer in dispersion at a concentration of 0.5 to 3% by weight, the actual dissolution being obtained thanks to the residence time of the dispersed polymer in the injection pipeline.

In fact, in EOR, the suspension or dispersion is transported by pipeline over fairly long distances (100 to 10 000 metres) and then injected to depths of at least 400 metres, with a pumping rate of 2 m/sec. For 1000 metres of pipeline or injection tube, the travel time is eight minutes, which is sufficient for total dissolution of the polymer.

More precisely, the subject of the invention is an installation for enhanced oil recovery comprising in succession:
- a storage hopper for water-soluble polymer having a standard grain size distribution,
- a grinding device for dispersing the polymer comprising:
- a wetting cone in which the polymer is metered, usually using a metering screw, the said cone being connected to a primary water inlet circuit
- at the bottom end of the cone:
  - a chamber for grinding and draining the dispersed polymer comprising:
    - a rotor driven by a motor and equipped with knives optionally tilted with respect to the radius of the rotor,
    - a fixed stator consisting of blades optionally tilted with respect to the radius of the rotor and uniformly spaced, the rotor/stator assembly permitting a wet grinding of the polymer, on all or part of the periphery of the chamber, a ring fed by a secondary water circuit, the ring communicating with the chamber for the spraying of pressurised water on the blades of the stator and thereby releasing the ground and swollen polymer on the surface of the said blades, the assembly serving to decrease the speed of rotation and increase the concentration of the dispersion leaving the grinding chamber.

optionally, a low pressure pump for feeding the high pressure injection pump without cavitation if the pressure of the apparatus is insufficient, a pump for injecting the polymer suspension under pressure into the pipeline conveying the injection water introducing the mixture (polymer+injection water) into the well, the said installation being without additional dissolution tanks.

In the rest of the description and in the claims, "polymer having standard grain size distribution" means a polymer with a grain size distribution of between 0.15 and 1 mm, in particular a very high molecular weight (15 to 25 million) copolymer of acrylamide and/or methacrylamide.

According to a first feature, the polymer is wet in the cone by overflow, the cone being equipped in this case with a double jacket at the base of which the primary water inlet circuit is connected. Alternately, this wetting can also take place by any other means, for example spray nozzles or a flat jet.

In practice, the rotor is equipped with 2 to 20 knives, advantageously between 4 and 12. However, depending on the rotor diameter, the number of knives may vary. Similarly, the number of blades of the stator is variable according to the diameter thereof. In practice, it is between 50 and 300, advantageously between 90 and 200 for a rotor diameter of 200 mm. Moreover, and according to another feature, the knives are optionally more or less tilted with respect to the radius of the rotor. Advantageously, this tilt is between 0 and 15°, preferably between 2 and 10°.

According to another feature, the distance between the blades of the stator is between 50 and 800 microns. For effective grinding, the distance between the knives of the rotor and the blades of the stator is between 50 and 300 microns, advantageously between 100 and 200 microns, in practice about 100 microns. Advantageously, the blades of the stator are tilted, at an angle smaller than 10° with respect to the radius of the rotor. These blades are either assembled in a casing, or cut in the mass of a metal or of a high strength compound.

In one advantageous embodiment, the rotor knives are not tilted, while the stator blades are tilted.

Furthermore, concerning the peripheral ring, it communicates with the grinding and draining chamber via perforations in the form of holes, slits or equivalent, whereof the size and distribution on the ring are such that the secondary water can be propelled on the blades of the stator at a pressure serving to prevent the clogging by the gelled polymer, of the spaces between the blades. Accordingly, the pressure applied by the rotor pump effect can be sharply decreased without a risk of plugging. The smaller the spacing of the blades, the higher the pressure required for continuous operation. Obviously, the storage hopper permits the continuous feed and receives the polymer either in bulk (trucks) or in bags of various capacities.

According to an essential feature, the installation is without dissolution tanks, the actual dissolution taking place directly in the pipeline in which the dispersed polymer is injected and in which the injection water flows. A diaphragm type pressure equalizer may be added to avoid pulsations of the system due to the flow rate adjustments.

In one particular embodiment, when the dissolution/maturation tank is distant from the grinding device, a positive displacement pump (Moyno type) is inserted with a speed variator for maintaining a predefined pressure (1 to 3 bar) at the inlet of the high pressure injection pumps. This pressure allows to supply the pump without cavitation.

The injection pumps are, for example, triplex screw or other pumps.

A further subject of the invention is a method for enhanced oil recovery implementing the installation described above.

According to this method, in continuous mode and under inert atmosphere, advantageously nitrogen:

the grinding device is fed with polymer having a standard grain size distribution, in the grinding device:

the polymer is prewetted in the wetting cone by a quantity of primary water suitable for obtaining a polymer suspension having a concentration of 15 to 100 g/l, advantageously 20 to 80 g/l, then, instantaneously, in the grinding and draining chamber, the size of the prewetted polymer is reduced, in practice to a size of 50 to 200 microns by chopping the polymer between the knives of the rotor and the blades of the stator without degradation of the molecular weight of the polymer, then, the pressurised secondary water from the peripheral ring is used to clear the interstices between the blades of the stator in which the swollen polymer is liable to be fixed, the dispersed polymer practically at a concentration of 3 to 30 g/l, advantageously 10 to 25 g/l, is then transferred to the pressurized injection pump, optionally using a withdrawal pump at a pressure of between 1 and 3 bar, the pump is used to inject the dispersed polymer into the pipeline in which the injection water flows for the injection of the mixture (polymer+injection water) into the well.

Advantageously, the primary water represents between 20 to 40% by weight of the total water (primary water+secondary water) whereas secondary water represents between 60 to 80% of the total water (primary water+secondary water).

In practice, according to one feature of the method, the speed of rotation of the rotor is between 2000 and 5000 rpm, on average about 3000 rpm for a cutting diameter of 200 mm. It is between 3000 and 6000 rpm for a cutting diameter of 100 mm and between 1500 and 3000 rpm for a cutting diameter of 400 mm. More generally, according to the diameter of the rotor also referred to as cutting diameter, the peripheral rotor speed is between 20 and 40 m/s instead of 90 to 120 m/s for a Comitrol® 1500 apparatus.

Furthermore, to avoid plugging the space between the stator blades by the ground polymer, the secondary water is propelled through the perforations of the ring at a pressure of at least 1 bar, usually at the main water pressure, or 3 to 6 bar or more, for very fine intervals, in general between 1 and 10 bar.

In practice, the injection water is a brine coming from the oil production water, seawater or aquifer water. Similarly, the polymer is a (co)polymer of acrylamide and/or methacrylamide.

Advantageously, the temperature of the injection water is between 20° C. and 80° C. However, if seawater is used, it may be drawn from the medium depths (50 to 200 m), and its temperature may be much lower (4 to 10° C.).

BRIEF DESCRIPTION OF THE DRAWING FIGURES

The invention and its advantages will appear clearly from the examples described below, in conjunction with the figures appended hereto.

DETAILED DESCRIPTION

Example 1

Installation

Figure 1:
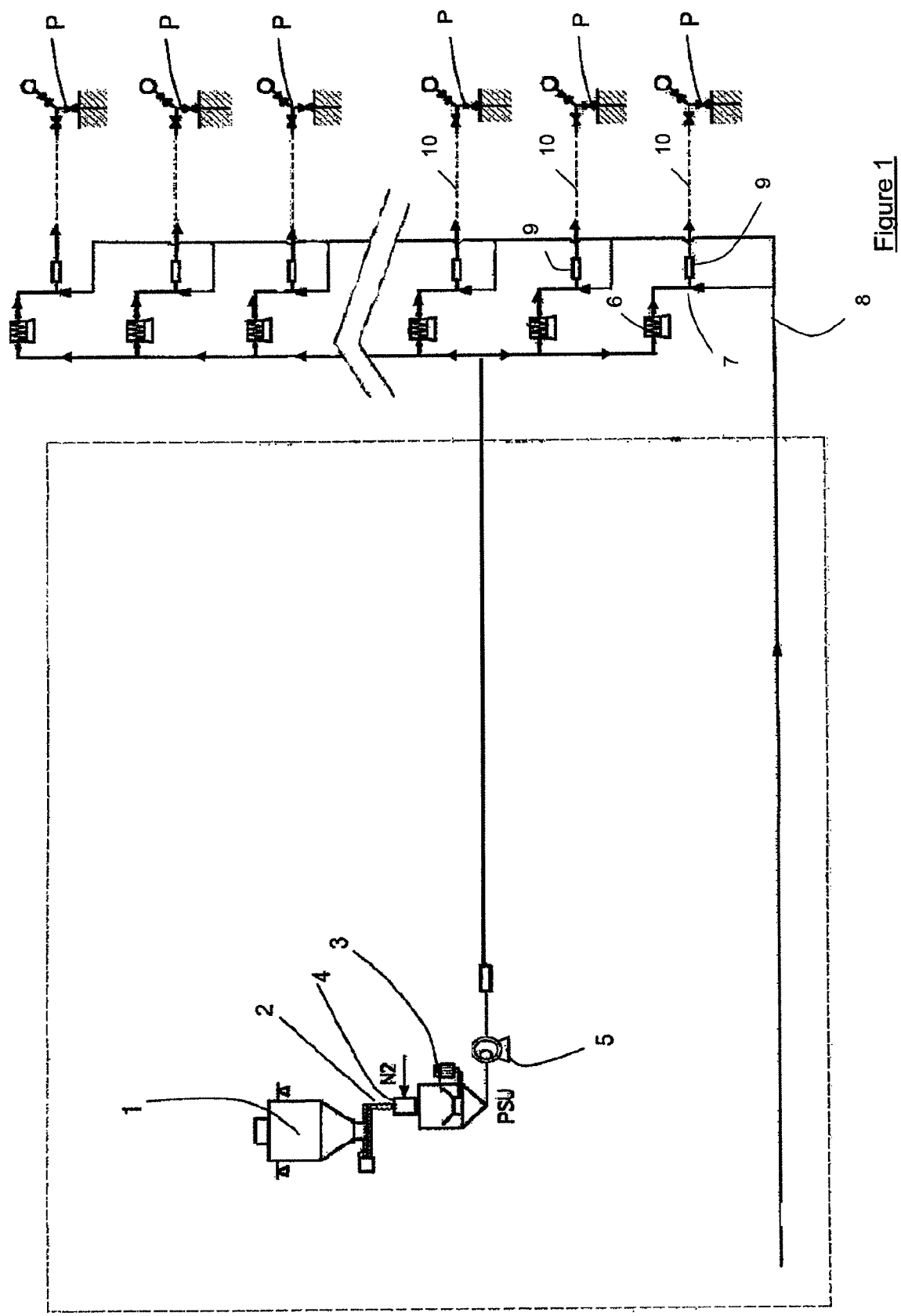
FIG. 1 is a schematic representation of an installation of the invention.

FIG. 1 shows the installation implementing the method of the invention. The installation comprises a storage silo (1) for the polymer in powder form, which has, at its base, a metering screw (2) for transferring the polymer to the grinding device (3) under nitrogen (4).

Figure 2:
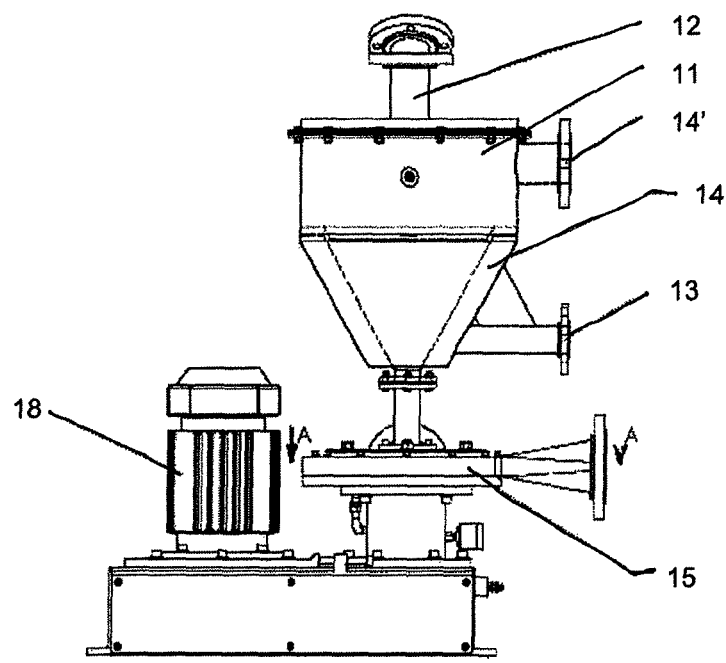
FIG. 2 is a schematic side view of the grinding device.
Figure 3:
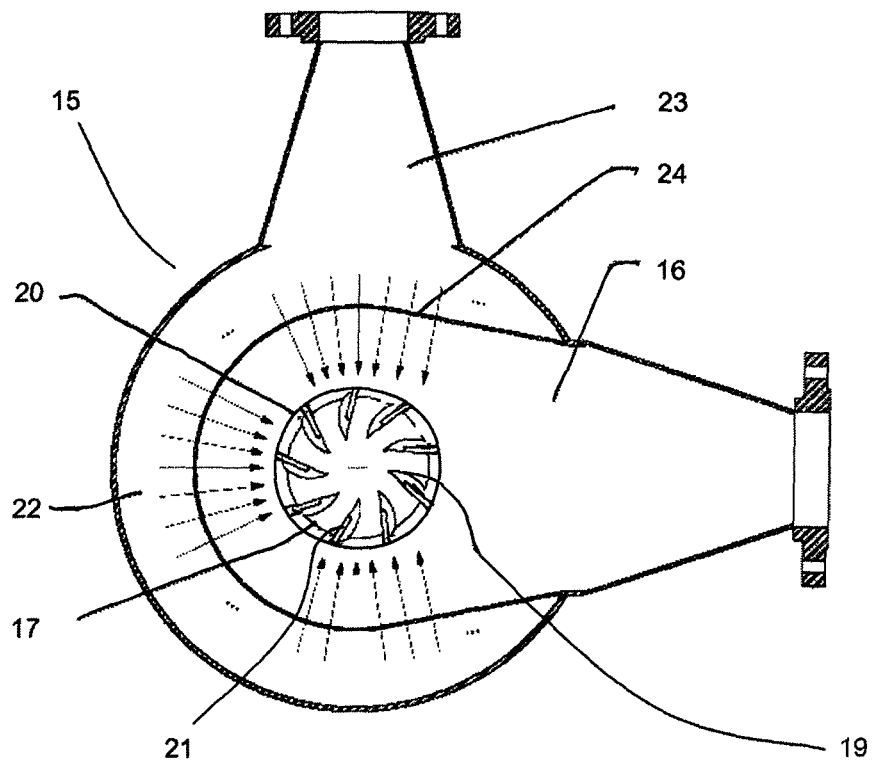
FIG. 3 is a cross section along AA' of FIG. 2.

The grinding device is shown more particularly in FIGS. 2 and 3.

The grinding device comprises:
- a wetting cone (11) connected at its apex to a column (12) dosing the standard grain size distribution polymer, usually via a metering screw, the cone (11) being connected at its bottom to a primary water inlet circuit (13) which feeds an overflow (14, 14'),
- at the bottom end of the cone, an assembly (15) comprising:
  - a chamber (16) for grinding and draining the dispersed polymer (FIG. 2) comprising:
    - a rotor (17) driven by a motor (18) fitted with knives (19),
    - a fixed stator (20) comprising blades (21) uniformly spaced and slightly tilted with respect to the radius of the rotor,
  - on all or part of the periphery of the chamber, a ring (22) fed by a secondary water circuit (23), the ring (22) communicating with the chamber (16) via slits (24) for spraying pressurised water on the blades (21) of the stator (20).

In the grinding device:
- the polymer is prewetted in the wetting cone by a quantity of primary water (20 to 40% by weight of the total water) suitable for obtaining a polymer suspension having a concentration of 20 to 80 g/l,
- then, instantaneously, in the grinding and draining chamber, the size of the prewetted polymer is reduced to a size of 50 to 200 microns by chopping the polymer between the knives of the rotor and the blades of the stator,
- then, the pressurised secondary water (60 to 80% by weight of the total water) from the peripheral ring is used to clear the interstices between the blades of the stator in which the swollen polymer is liable to be fixed.

The polymer is then withdrawn from the grinding and dilution unit using a Moyno pump (5) to be transferred via a line (6) to a T (7) where the polymer is mixed with the brine (8), before being injected into the pipeline (10) extending to the well P, using an injection pump (9).

Example 2

Application

Application Conditions:

An oil field has 6 injection wells and 12 production wells.

The pressure of each well is between 70 and 100 bar. The distance between the polymer suspension point and the injection head of these wells varies from 400 to 3600 m. The average depth of the wells is 700 m. The pressure of each well is maintained by a choke placed on the dilution water before the mixing with the polymer to avoid degrading the polymer mechanically.

The injection water flow per well is a maximum of 40 m$^3$/h with a total of less than 240 m$^3$/h for the 6 wells. This quantity is adjusted in order to maintain the pressure at each wellhead to avoid fracturing the reservoir.

The temperature of the treated and reinjected production water is 55° C. with a TDS ("Total Dissolved Solid" or salinity) of 18000 ppm.

The permeability of the wells is 2000 millidarcies.

The Polymer:

The polymer is a 30% anionic polyacrylamide, molecular weight 17 million. It is injected in a concentration of 1200 ppm at a viscosity of 14 cps. The quantity of polymer used per hour is 288 kilograms.

The Installation:

The equipment used comprises:
1) A 60 m$^3$ silo containing the polymer and fed by bulk truck.
2) A grinding device according to the invention placed under nitrogen blanket (<100 ppm O$_2$) to avoid the chemical degradation of the polymer at injection and with technical characteristics and dissolution conditions which are given in the table below.

| | Test 1 "PSU 300" |
|---|---|
| Technical features of the grinding unit | |
| Cutting diameter in mm (rotor size) | 200 |
| Number of fixed knives | 90 |
| Height of fixed knives in mm | 16.6 |
| Spacing between knives | 300 microns |
| Spacing between fixed/mobile knives | 100 microns |
| Cutting angle | 3° |
| Number of mobile knives (i.e.: on the rotor) | 6 |
| Rotor speed | 3000 rpm |
| Rotor power | 7.5 Kw |
| Dispersion characteristics | |
| Primary water flow rate | 10 m$^3$/h |
| Anionic polyacrylamide flow rate (anionicity 30%; molecular weight 19 million; grain size distribution 0-1000) | 300 kg/h |
| Secondary water flow rate in the concentric ring surrounding the stator (pressure 2 bar) | 20 m$^3$/h 25° c. |
| Final concentration of dispersion | 10 g/l |
| Final pressure | 1.5 bar |

3) A Moyno type feeding pump (progressive cavity pump) with speed variator, 40 m$^3$/h–3 bar.

4) Six Triplex pumps: 120 bar—delivery 0.7 to 5 m³/h.
5) An introduction point into the injection water line followed by a static mixer.

A series of controls allows to maintain the pressure of 1 bar at the suction of the Triplex pumps by adjusting the withdrawal pump and adjusting the secondary water flow rate and the powder flow rate of the grinding unit.

This method of injection carried out for several months demonstrated no problem of well plugging or pressure increase.

Appended Remark:

The installation of the invention is particularly appropriate for injecting associative polymers, "comb polymers" or "star polymers" which have a significant tendency to foaming, the problem being resolved by eliminating the dissolution tanks. However, it must be remembered that this type of polymer has a longer dissolution time than standard polymers (generally 4 to 5 hours at 20° C.). Use of the installation of the invention and of the production water at a high temperature (40 to 60° C.) enables direct injection in the majority of cases.

At the same time and obviously to a person skilled in the art, this installation applies to any other type of injectable water-soluble polymer (cellular derivatives, xanthan gum, polyvinylpyrrolidone, etc.).

The invention claimed is:

1. Installation for enhanced oil recovery comprising in succession:
    a storage hopper for water-soluble polymer having a standard grain size distribution,
    a grinding device for dispersing the polymer, comprising:
        a wetting cone in which the polymer is metered, said cone being connected to a primary water inlet circuit at a bottom end of the cone:
            a chamber for grinding and draining the dispersed polymer comprising:
                a rotor driven by a motor and equipped with knives,
                a fixed stator having blades,
            on all or part of a periphery of a chamber, a ring fed by a secondary water circuit, the ring communicating with the chamber for spraying of pressurised water on the blades of the stator and thereby releasing ground and swollen polymer on a surface of said blades;
    a pump for pressurized injection of polymer suspension into a pipeline conveying injection water and introducing a mixture of polymer and injection water into a well, installation being without additional dissolution tanks.

2. Installation according to claim 1, wherein the knives are tilted with respect to a radius of the rotor.

3. Installation according to claim 2, wherein the knives are tilted by an angle of between 0 and 15° with respect to the radius of the rotor.

4. Installation according to claim 3, wherein the knives are tilted by an angle between 2 and 10° with respect to the radius of the rotor.

5. Installation according to claim 1, wherein the blades are tilted with respect to a radius of the rotor and uniformly spaced.

6. Installation according to claim 1, wherein a first distance between the blades of the stator is between 50 and 800 microns, while a second distance between the knives of the rotor and the blades of the stator is between 50 and 300 microns.

7. Installation according to claim 6, wherein said second distance is between 100 and 200 microns.

8. Method for enhanced oil recovery employing the installation according to claim 1, comprising, in continuous mode and under inert atmosphere:
    feeding the grinding device with polymer having a standard grain size distribution,
    in the grinding device:
        prewetting the polymer in the wetting cone by a quantity of primary water suitable for obtaining a polymer suspension having a concentration of 15 to 100 g/l,
        then, instantaneously, in the grinding and draining chamber, reducing size of the prewetted polymer by chopping the polymer between the knives of the rotor and the blades of the stator,
        then, propelling the pressurized secondary water from the peripheral ring to clear interstices between the blades of the stator in which the swollen polymer is liable to be fixed,
    then transferring dispersed polymer to the pressurized injection pump, and
    using the pump to inject the dispersed polymer into the pipeline in which the injection water flows for introducing the mixture of polymer and injection water into the well.

9. Method according to claim 8 wherein the polymer suspension obtained by prewetting has a concentration of 20 to 80 g/l.

10. Method according to claim 8, wherein the primary water represents between 20 to 40% by weight of total water, total water comprises the primary water and the secondary water, and the secondary water represents between 60 to 80% of the total water.

11. Method according to claim 8, wherein peripheral speed of rotation of the rotor is between 20 and 40 m/s.

12. Method according to claim 8, wherein the secondary water is propelled under a pressure of between 1 and 10 bar.

13. Method according to claim 12, wherein the secondary water is propelled under a pressure of between 3 and 6 bar.

14. Method according to claim 8 wherein the polymer comprises a copolymer of acrylamide and/or methacrylamide.

* * * * *